Figure 2:
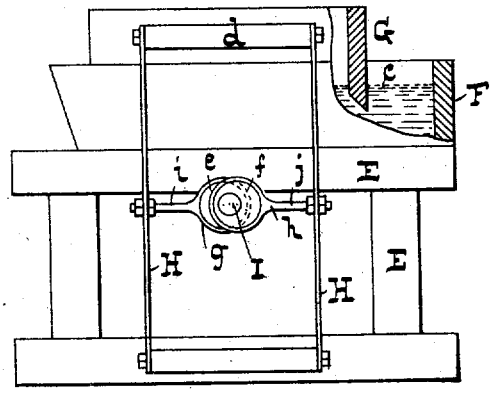

5 Sheets—Sheet 1.

H. D. MENTZEL.

MECHANICAL MOVEMENT.

No. 11,271. Reissued Sept. 13, 1892.

-WITNESSES-

Dan'l Fisher

C. H. Andrews.

-INVENTOR-

Henry Dorsey Mentzel, by Geo. H. Howard, Attys.

THE NORRIS PETERS CO., PHOTO-LITHO., WASHINGTON, D. C.

H. D. MENTZEL.

MECHANICAL MOVEMENT.

No. 11,271. Reissued Sept. 13, 1892.

-WITNESSES-

Dan'l Fisher
C. H. Andrews,

-INVENTOR-

Henry Dorsey Mentzel,
by Chas. W. T. Thomas,
Atty.

THE NORRIS PETERS CO., PHOTO-LITHO., WASHINGTON, D. C.

H. D. MENTZEL.

MECHANICAL MOVEMENT.

No. 11,271. Reissued Sept. 13, 1892.

-WITNESSES-

Dan'l Fisher

C. H. Andrews

-INVENTOR-

Henry Dorsey Mentzel, by Chas. W. T. Ward, atty.

THE NORRIS-PETERS CO., PHOTO-LITHO., WASHINGTON, D. C.

H. D. MENTZEL.

MECHANICAL MOVEMENT.

No. 11,271. Reissued Sept. 13, 1892.

-WITNESSES-

Dan'l Fisher
C. H. Andrews,

-INVENTOR-

Henry Dorsey Mentzel
by Geo. H. J. Mead,
atty.

THE NORRIS PETERS CO., PHOTO-LITHO., WASHINGTON, D. C.

H. D. MENTZEL.

MECHANICAL MOVEMENT.

No. 11,271. Reissued Sept. 13, 1892.

-WITNESSES-

Dan'l Fisher
C. H. Andrews.

-INVENTOR-

Henry Dorsey Mentzel,
by Wm W. T. Maud,
atty.

THE NORRIS PETERS CO., PHOTO-LITHO., WASHINGTON, D. C.

UNITED STATES PATENT OFFICE.

HENRY DORSEY MENTZEL, OF BALTIMORE, MARYLAND.

MECHANICAL MOVEMENT.

SPECIFICATION forming part of Reissued Letters Patent No. 11,271, dated September 13, 1892.

Original No. 447,964, dated March 10, 1891. Application for reissue filed June 11, 1892. Serial No. 436,408.

*To all whom it may concern:*

Be it known that I, HENRY DORSEY MENTZEL, of the city of Baltimore and State of Maryland, have invented a new and useful Mechanical Movement, of which the following is a specification.

The object of this invention is to produce in a machine, apparatus, or combination of mechanical appliances a noiseless reciprocating movement; and it relates to what I term a "spring-toggle"—that is to say, a toggle without the usual knuckles or joints, which wear and become loose.

My improved spring-toggle in its simplest form consists in a spring-bar having one end thereof held so as to prevent its movement and the other end lose and attached to the object to be moved, combined with a moving device of any appropriate description, which is applied to the side of the bar at a point between the ends thereof and operated or moved in a direction transversely of the said bar to deflect it from its normal shape, and thus by practically shortening or lengthening the bar cause its loose end to have an endwise motion, which is communicated to the object to be vibrated or shaken. The motion effected as described is noiseless, and is particularly useful where a rapid short reciprocating stroke is required. The elementary spring-toggle, as specified, is susceptible to a great variety of modifications, several of which will be hereinafter described, and it is generally used in connection with another toggle of a similar character, in order that the object to be reciprocated may be better supported. The spring-bars may be straight, curved, or semicircular in shape and separated at their ends or connected; but in all cases movement is applied to them in a direction practically at a right angle with the direction of movement of the driven or movable device.

In the further description of the said invention which follows reference is made to the accompanying drawings, forming a part hereof, and in which—

Figure 1:
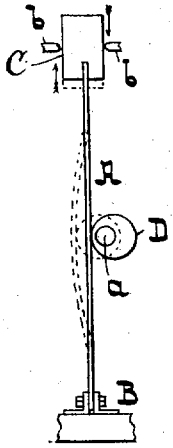

Figure 1 is a side elevation of the invention in its simplest form and illustrating the application of a straight spring-toggle to a block or weight which is to be vertically shaken. Fig. 2 is a partly-sectional side view of a pulp-screen, such as is used in the manufacture of paper, supported and operated in accordance with my invention; and Fig. 3, a top view of the same. Figs. 4 to 15, inclusive, illustrate modifications in the construction and arrangement of the invention as applied to pulp-screens and hereinafter fully described. Fig. 16 is a top view of a Fourdrinier wire and some of its connections as employed in the manufacture of paper and shaken by means of my improved spring-toggle, and Fig. 17 an end view of the same with the wire-cloth removed.

Referring to Fig. 1, A is a spring-bar secured at one end to a fixed support B and at the other end connected to a block or weight C, which constitutes the device to be reciprocated in the direction indicated by the arrows. D is an eccentric or cam, so placed that its short side is in contact with the spring-bar when the same is straight and adapted for revolution about the center *a*. As the full part of the eccentric is turned to the spring-bar the same is deflected from a straight line and the block or weight C, which is guided by the devices *b*, is drawn down. The dotted delineation of the said parts illustrates this change in position. As the eccentric assumes its original position the spring-bar returns to its normal shape and the weight or block is elevated. By a rapid revoluble motion of the eccentric the spring-bar may be made to effect a rapid reciprocating movement of the block or weight C.

Figure 3:
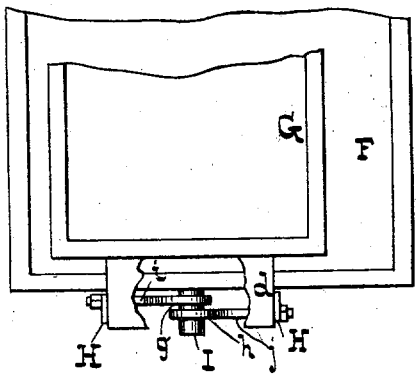

Referring to Figs. 2 and 3, which show the invention as applied to a pulp-screen, E is the frame or stand of the machine which supports the vat F. G is the pulp-screen having the usual perforated bottom situated in the vat with its lower edge below the surface of the pulp, which is designated by *c*. H H are spring-bars, preferably of steel, the upper ends of which are secured to a projection *d* on the screen and the lower ends to a portion of the frame E. I is a revoluble shaft sustained in any suitable manner by the frame E. On this shaft are fastened the eccentrics *e* and *f*, placed in diametrically-opposite directions as regards their full or operative sides. These eccentrics are provided with straps *g* and *h* and rods *i* and *j*, which unite them with the spring-bars H. The shaft I extends entirely across the machine and at its far end is provided with a set of eccentrics, spring-bars, and other attachments corresponding with those described, and also with a driving-pulley adapted to be revolved by means of a belt, all of which are omitted from the drawings. When the shaft I is in revolution, the spring-bars are alternately drawn together or deflected from their normal shape and then returned to their original position. In the deflection of the bars from a straight line the pulp-screen is drawn down and when they are straightened it is elevated. This reciprocating movement is executed rapidly.

Figure 4:
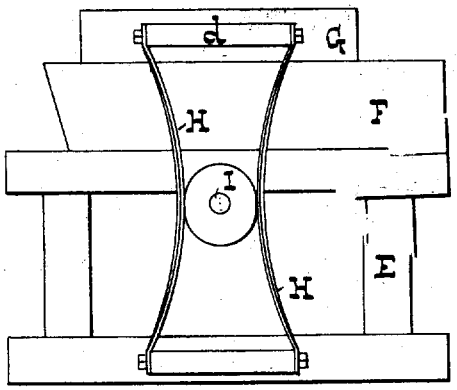
Figure 5:
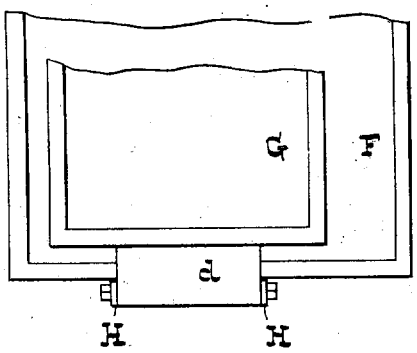

In Figs. 4 and 5 the springs, instead of being straight bars, are curved and placed so that their ends flare outward at the top and bottom, and they are reinforced at the center by means of plates to stiffen them after the manner of carriage-springs. Instead of the shaft carrying eccentrics, as in the construction shown in Figs. 2 and 3, it is provided with a cam at each end which cam bears against the inner surface of the springs. With this arrangement the bars are straightened and the screen raised by the action of the cams, and the return movement is effected by the springs assuming their original positions in following the retreating surfaces of the cams.

Figure 6:
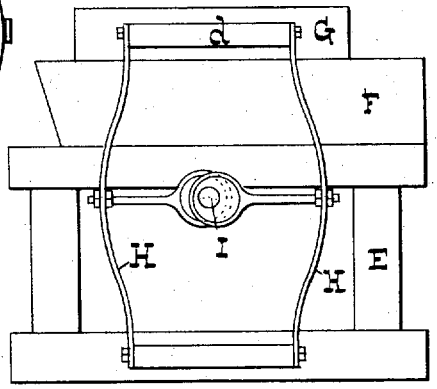
Figure 7:
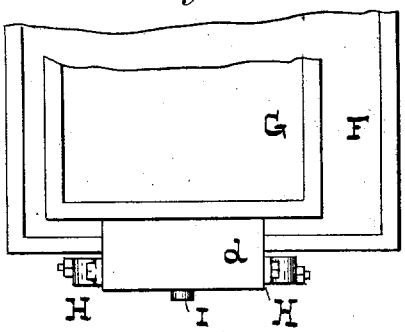

In Figs. 6 and 7 the spring-bars are curved outward instead of inward, as in Figs. 4 and 5, and the eccentrics and rods shown in Figs. 2 and 3 are employed to straighten the flexible bars and elevate the screen, the downward motion, as in the construction shown in Figs. 4 and 5, being obtained by the springs assuming their original position.

Figure 8:
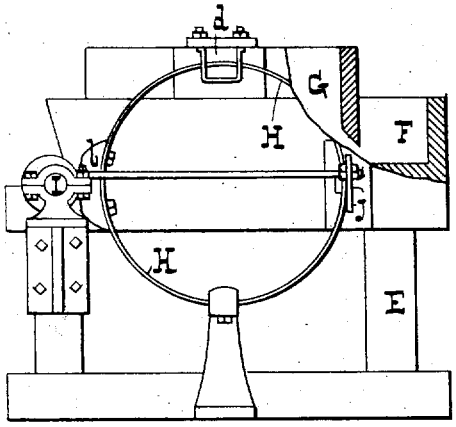
Figure 9:
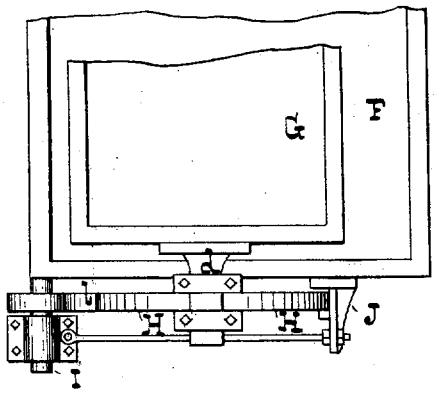

In Figs. 8 and 9 the curved spring-bars are of semicircular shape, with their ends brought together at the top and bottom, so that the springs form a complete circle. The elevation in this case is effected by securing one spring-bar to a bracket J and providing the other with a block *l*, against which an eccentric or cam is adapted to bear in one part of its revolution. In this modification of the invention only one spring-bar is actually moved by the cam; but the effect is the same, as in compressing one bar the other is similarly affected.

Figure 10:
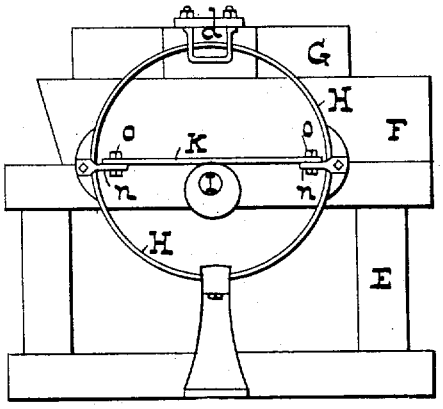
Figure 11:
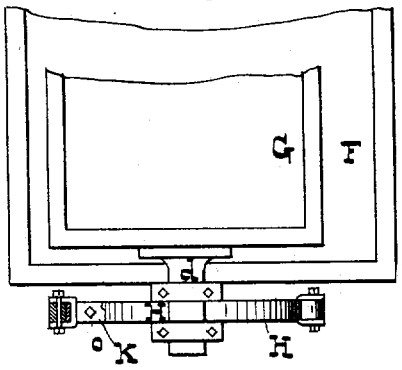

In Figs. 10 and 11 the circular form of springs is maintained; but its deflection is effected by the action of a cam or eccentric on a straight flexible bar K, tied to the semicircular bars by means of lugs *n* and bolts *o*.

Figure 12:
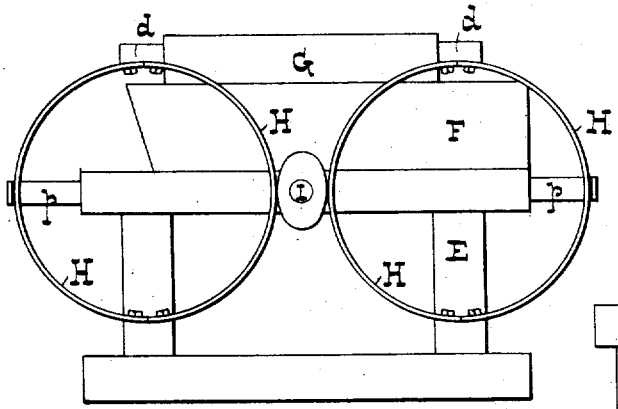
Figure 13:
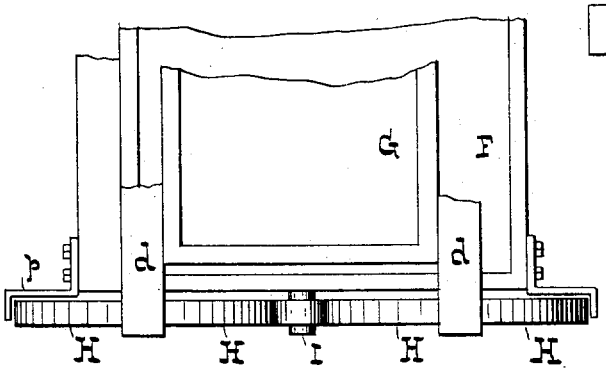

In Figs. 12 and 13 four semicircular spring-bars are employed and the operative cam is situated between the two inner bars. The outer bars are held to prevent outward movement by means of straps *p* from the frame.

Figure 14:
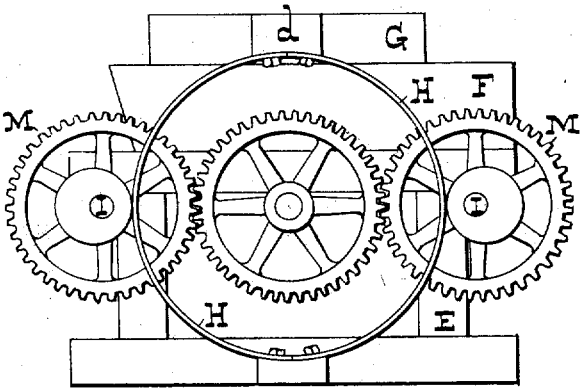
Figure 15:
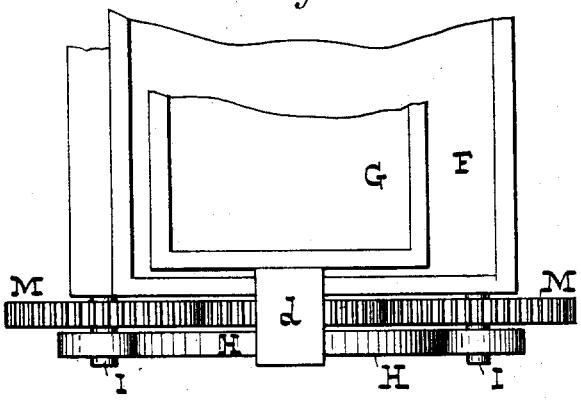
Figure 16:
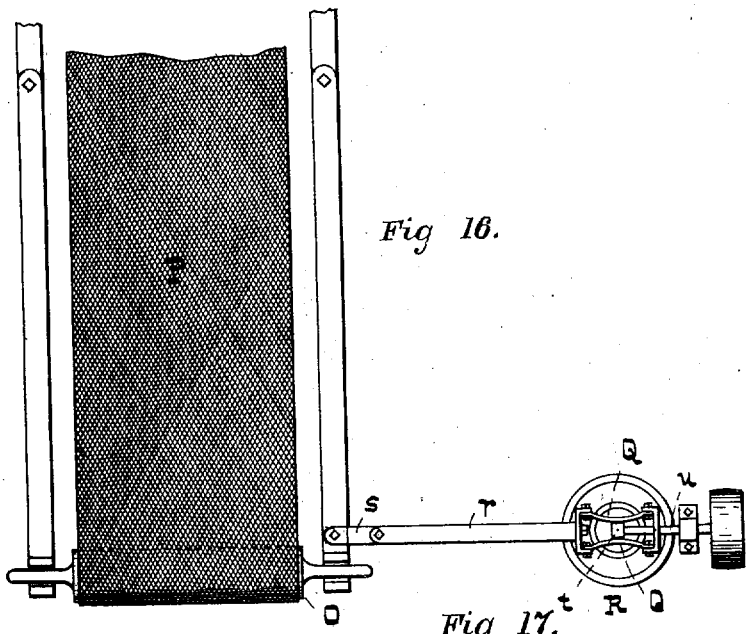

In Figs. 14 and 15 two semicircular spring-bars are used, and they are both subjected to the action of a cam or eccentric. The two eccentrics are made to act together by means of a gear-wheel M on each shaft and a connecting one between them.

Figure 17:
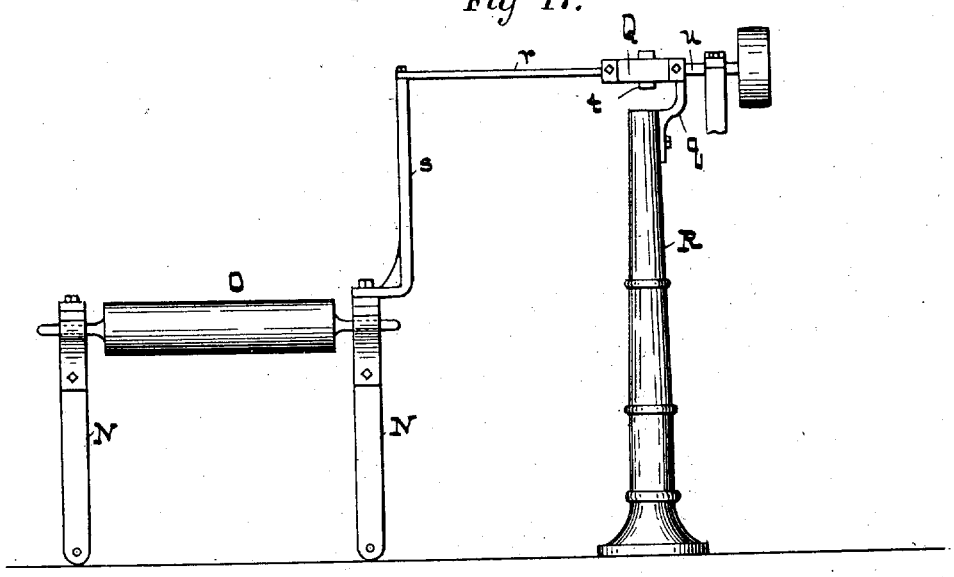

Referring to Figs. 16 and 17, which, as before stated, illustrate the invention applied to a Fourdrinier wire of a paper-making machine, N is the frame of the machine, which supports rollers O, one only of which is shown. P is a wire-cloth endless apron which passes around the rollers O, and which with them has to be shaken laterally. Q represents the toggle-bars, which at one end are secured to a bracket *q*, forming a part of a column R, seated on the floor. The other end of the toggle-bars is connected to the frame of the wire by means of a connecting-rod *r* and a stand *s*. Between the toggle-bars is situated a cam *t* on a shaft *u*, provided at its outer end with a driving-pulley. The alternate opening and closing of the toggle-bars effect a shake to the Fourdrinier wire, which is noiseless.

It is evident that the present invention can be applied to various other devices requiring a short reciprocating motion, too numerous to mention.

I claim as my invention—

1. A toggle to effect a reciprocating motion, which consists of a spring-bar secured so as to be immovable at one end and at the other end attached to the device to be reciprocated, combined with a deflecting device which is applied to the said bar at a point between the ends thereof, substantially as and for the purpose specified.

2. In combination with the frame or some other stationary part of a machine, spring-bars connected at their ends to the said frame and also to some device to be reciprocated, and means for deflecting intermediate portions of the said spring-bars in a direction practically at a right angle with the line of movement of the said driven device, substantially as and for the purpose specified.

3. In combination with the frame or some other stationary part of a machine, spring-bars connected at their ends to the said frame and also to some device to be reciprocated, and a revoluble shaft situated between the said bars and carrying eccentrics, whereby in the revolution of the said shaft the springs are deflected from their normal position or shape, substantially as and for the purpose specified.

4. In combination with a stationary frame and a movable frame situated above the stationary one, two separated bars or devices which connect the two frames and are held yieldingly in the position of their nearest approach to each other, and a rotating device situated between and in contact with the said connecting-bars or devices, adapted in its revolution to simultaneously and equally distend or farther separate the said bars, (the said bars being adapted to return automatically to their normal position,) whereby a vertical reciprocating motion is imparted to the said movable frame, substantially as specified.

HENRY DORSEY MENTZEL.

Witnesses:

GEO. E. TAYLOR,

W. C. JENNESS.